United States Patent [19]
Al-Hamlan

[11] Patent Number: 6,109,288
[45] Date of Patent: Aug. 29, 2000

[54] FLOW CONTROL APPARATUS

[76] Inventor: Saleh A. Al-Hamlan, Alshifa P.O. Box 36664, Riyadh, Saudi Arabia

[21] Appl. No.: 09/218,045

[22] Filed: Dec. 22, 1998

[51] Int. Cl.[7] .................................................. F16K 17/168
[52] U.S. Cl. ........................................ 137/87.01; 137/114
[58] Field of Search .................................... 137/114, 595, 137/607, 87.01, 357; 251/26

[56] References Cited

U.S. PATENT DOCUMENTS

| | | | |
|---|---|---|---|
| 2,057,194 | 10/1936 | Kagi ......................................... | 137/114 |
| 3,642,021 | 2/1972 | Muller et al. ............................ | 137/114 |
| 4,282,902 | 8/1981 | Haynes ..................................... | 137/595 |
| 5,095,941 | 3/1992 | Betz ......................................... | 137/607 |
| 5,111,846 | 5/1992 | Hochstrasser et al. ................. | 137/607 |
| 5,322,084 | 6/1994 | Ghiassian ................................ | 137/607 |

*Primary Examiner*—Stephen M. Hepperle
*Attorney, Agent, or Firm*—Dougherty & Troxell

[57] ABSTRACT

A flow control apparatus for regulating the flow of hot and cold water through a mixing valve and for preventing undiluted hot water from being inadvertently delivered to a common outlet includes a common chamber and a pair of diaphragm valves on opposite sides of the common chamber. It also includes a check valve in the common chamber for opening and closing the diaphragm valves. Conventional piping, preferably flexible piping is used to connect the mixing valve to a source of hot water and to a source of cold water. The diaphragm valves and check valve are connected and arranged to prevent the flow of hot water through the mixing valve in the absence of a flow of cold water. The flow control apparatus may also include a mechanism for overriding the mixing valve in order to deliver an undiluted flow of hot water to the common outlet.

20 Claims, 12 Drawing Sheets

FLOW CONTROL APPARATUS

FIELD OF THE INVENTION

This invention relates to a flow control apparatus and system for regulating the flow of two liquids and more particularly to a flow control apparatus and system for regulating the flow of hot and cold water through a mixing valve and for preventing undiluted hot water from passing through the valve.

BACKGROUND FOR THE INVENTION

Systems and apparatus for regulating the flow of one liquid in response to the flow of another are well known. For example, a U.S. Pat. No. 2,581,855 of Griffith discloses a system for controlling the temperature in a shower or the like. In that system, cross controls are provided so that compensation is made for a sudden or even a gradual change in the pressure in one or more of the water sources without a change in the relative flow of the other.

Another approach to flow control apparatus is disclosed in the U.S. Pat. No. 2,479,177 of Miller. The Miller patent discloses a duplex diaphragm valve for use in a commercial washing machine. As disclosed therein, a duplex valve having a single housing and two passageways directs hot and cold water to a common container. Each of the passageways is closable by a diaphragm which is controlled by a solenoid operated pilot valve and by a thermostat which is responsive to the temperature of the hot and cold water mix.

A et al U.S. Pat. No. 3,536,097 of Caparone discloses a hot water and cold water control arrangement which includes a mixing valve construction with means to supply undiluted hot water or hot water diluted with cold water in varying ratios. These ratios are determined by controls which may be selected by the user to determine the ratio supplied to the regulating valve. A cold water valve is also provided which may be supplied with cold water only. Mixing means controls the amount of cold water that is added to the hot water.

It is now believed that there may be a significant commercial demand for an improved flow control apparatus and system for regulating the flow of one fluid with respect to the flow of another. It is also believed that there may be a significant demand for an improved flow control apparatus for regulating the flow of hot and cold water through a mixing valve and means for preventing undiluted hot water from passing through the valve and at the same time providing means for overriding the prevention means to provide a flow of undiluted hot water.

The flow control apparatus in accordance with the present invention offers a number of advantages over the prior art. For example, the flow control apparatus in accordance with the present invention facilitates temperature adjustment over a wide range of temperatures and at the same time protects an individual against inadvertently delivering water at a temperature that could cause painful or serious burns to the individual.

In many hospitals, restaurants and commercial facilities, it is desirable to maintain a source of very hot water, for example, a source of hot water with a temperature as high as 90° C. (194° F.). Home hot water heaters are typically set at 120° F. (about 50° C.), however, can be adjusted to 155° F. (about 70° C.) which can cause serious burns and is particularly dangerous for small children. Accordingly, the flow control apparatus in accordance with the present invention provides means for automatically preventing the flow of hot water in the absence of the flow of cold water.

The flow control apparatus in accordance with one embodiment of the present invention also includes a hands-free feature which allows an individual to activate the apparatus with a foot or knee so that it is not necessary to touch a faucet before or after washing one's hands. The apparatus also includes a separate valve which is preferably wall mounted at a distance above the outlet for initiating a flow of undiluted hot water. It is also contemplated that this valve will be mounted outside of the reach of young children.

The apparatus in accordance with the present invention is also relatively compact and can be manufactured and installed at a competitive price. For example, the price of an installation in accordance with the invention will be less than the cost of an installation that senses a person's hands in the proximity of a faucet to initiate flow. The apparatus in accordance with the present invention is also relatively durable and capable of being installed in numerous installations including wash basins, home showers, hospitals and commercial facilities. In addition, a typical wash basin as for example one installed in a hospital provides for the normal faucet adjustment to regulate the temperature of the flow of diluted hot water and at the same time prevents the flow of hot water if someone has turned off the cold water at the tap.

BRIEF SUMMARY OF THE INVENTION

In essence, the present invention contemplates a flow control apparatus for regulating the flow of a first liquid with respect to the flow of a second liquid in a common distribution system. The apparatus includes a mixing valve and a common outlet which is connected to the mixing valve to direct a flow of mixed liquids into a basin or the like. The apparatus includes first regulating valve means for regulating the flow of a first liquid and second regulating valve means for regulating the flow of a second fluid. The apparatus also includes a third valve means for regulating the flow of the first and second liquids to the common outlet and means for automatically preventing the flow of the first liquid when the flow of the second liquid is interrupted. A separate valve means is also provided for overriding the means for automatically preventing the flow of the first liquid to thereby provide an undiluted flow of the first liquid to the common outlet and into a water basin or the like.

A preferred embodiment of the invention relates to a flow control apparatus for regulating the flow of hot and cold water through a mixing valve and for preventing undiluted hot water from passing through the valve. The apparatus includes a mixing valve for blending a flow of hot water with a flow of cold water and a common outlet for delivering a mixed stream of hot and cold water to a wash basin, shower or the like. The mixing valve includes a common chamber and a pair of diaphragm valves on opposite sides of the common chamber. A third valve or check valve is disposed in a common chamber for opening and closing the diaphragm valves. Means are also provided for connecting the mixing valve to a source of hot water and to a source of cold water so that a flow of hot water and flow of cold water are delivered to the mixing valve. Prevention means including a diaphragm valve prevents the flow of hot water through the mixing valve in the absence of a flow of cold water. In addition, means may be provided for overriding this prevention means to provide a flow of undiluted hot water.

A further embodiment of the invention relates to a mixing valve for regulating the flow of hot and cold water to a common outlet and for preventing hot water from passing through the valve in the absence of a flow of cold water. The mixing valve includes a first chamber within the housing and a first diaphragm valve disposed within the chamber. The mixing valve also includes first and second fluid conduits which are connected to or communicate with the first chamber. The first and second conduits are also connected to one another through the first diaphragm valve. Means are provided for connecting the first conduit to a source of cold water and for connecting the second conduit to the common outlet so that cold water flows through the mixing valve to the common outlet when the first diaphragm valve is opened.

The mixing valve also includes a second chamber and a second diaphragm valve within the second chamber. Third and fourth fluid conduits are connected to the second chamber. The third and fourth fluid conduits are also connected to one another through the second diaphragm valve. Means are provided for connecting the third conduit to a source of hot water and the fourth conduit to the common outlet. In this way, hot water flows through the mixing valve to the common outlet as long as there is a corresponding flow of cold water. Separate means may also be provided for delivering a flow of undiluted hot water to the common outlet.

The mixing valve in accordance with the further embodiment of this invention also includes a common chamber disposed between the first and second chambers and a first fluid passageway which connects the common chamber and the first chamber. A second fluid passageway is also provided for connecting the common chamber and the second chamber. In this embodiment of the invention, a check valve is disposed in the common chamber for allowing and preventing a flow of water through the first and second passageways to thereby open the two diaphragm valves so that hot and cold water are delivered to the common outlet. When the check valve is closed, the diaphragm valves close and water does not flow through the mixing valves.

The invention will now be described in accordance with the following drawings wherein like reference numerals have been used to designate like parts.

DESCRIPTION OF THE PREFERRED
EMBODIMENT OF THE INVENTION

Figure 1:
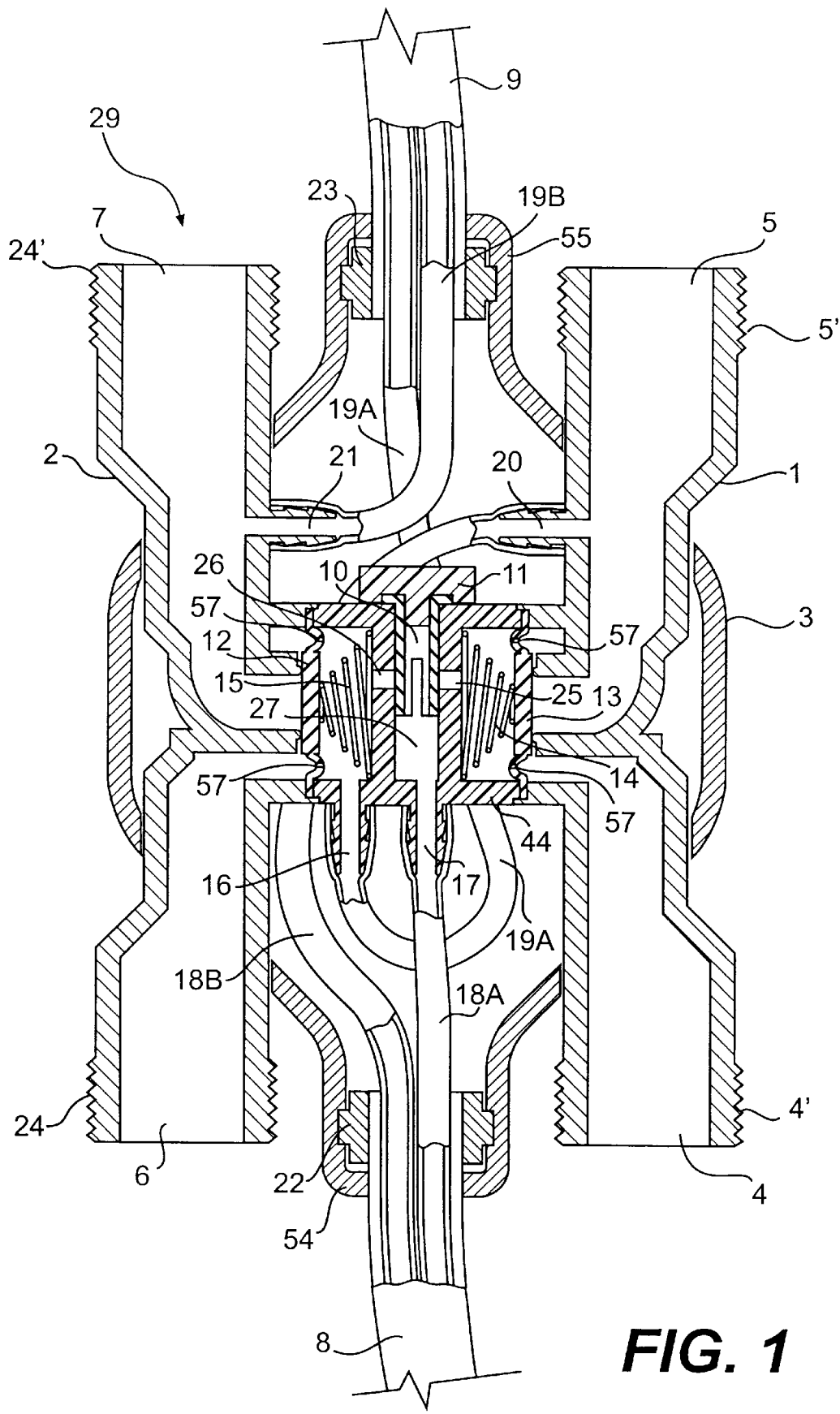
FIG. 1 is a cross sectional view of a mixing valve in accordance with the present invention which shows a pair of diaphragm valves in a closed position.
Figure 2:
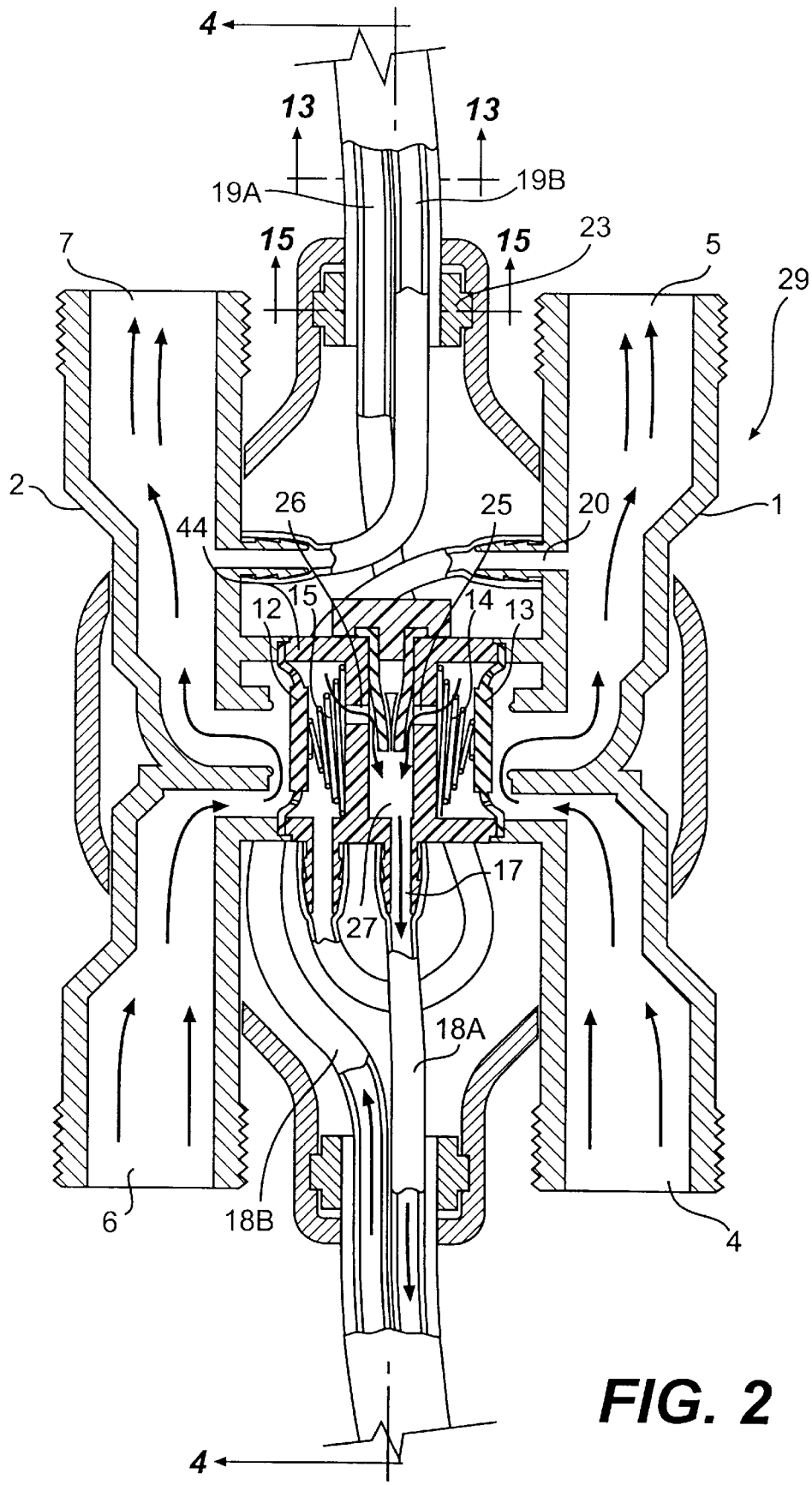
FIG. 2 is a cross sectional view of the mixing valve shown in FIG. 1, but with the diaphragm valves opened and arrows indicating the flow of fluid through the valves.
Figure 3:
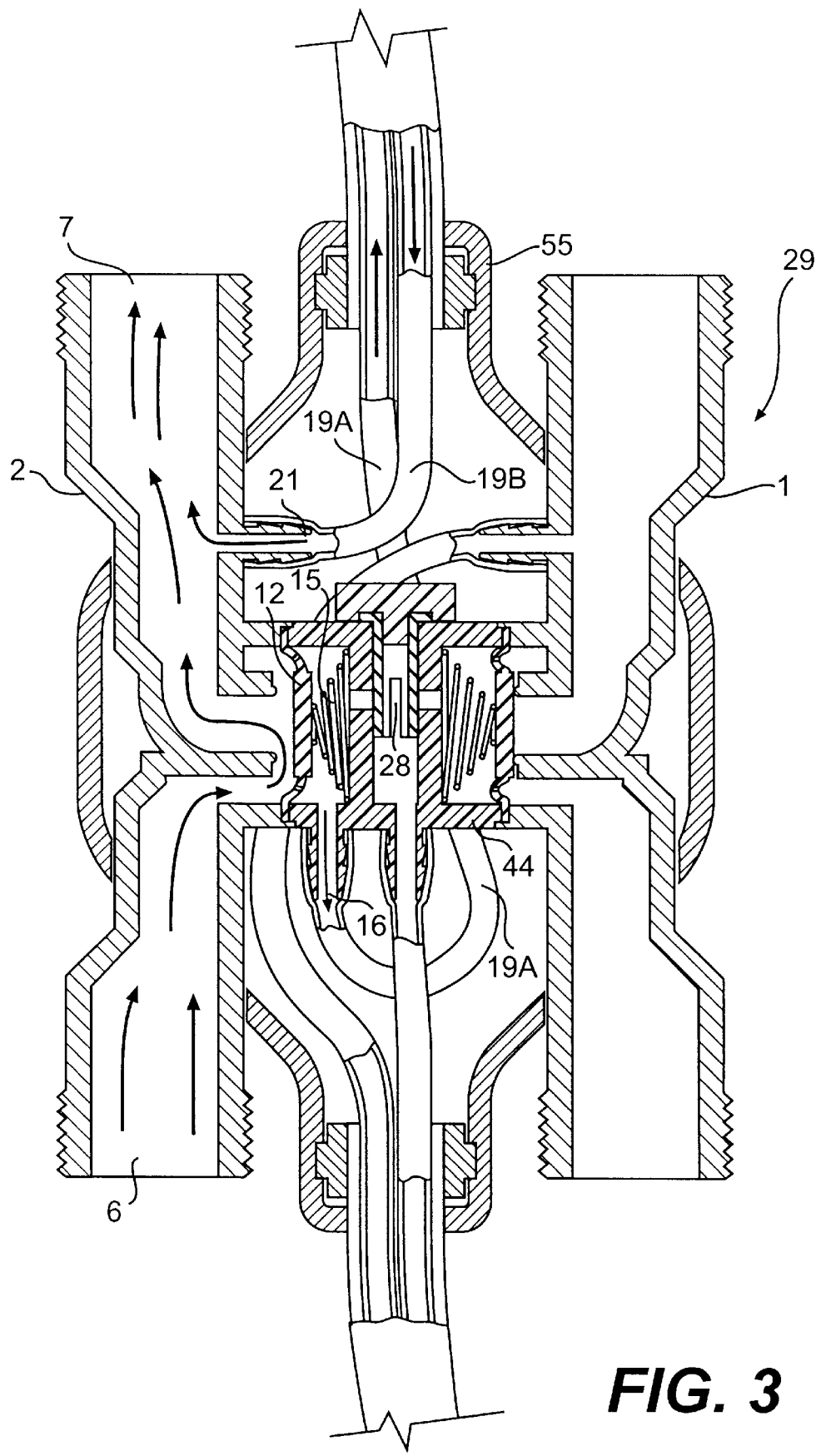
FIG. 3 is a cross sectional view of the mixing valve shown in FIGS. 1 and 2, but with one diaphragm valve open and the other closed to provide a flow of undiluted hot water.
Figure 4:
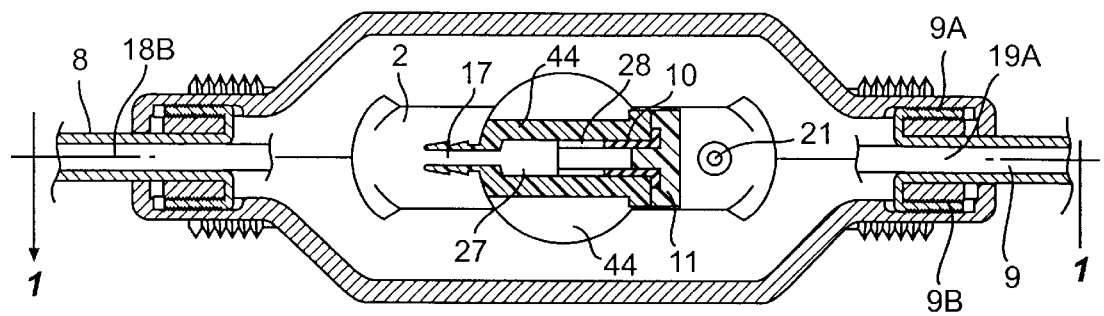
FIG. 4 is a cross sectional view of the mixing valves shown in FIGS. 1–3 taken along the section lines B—B in FIG. 2
Figure 5:
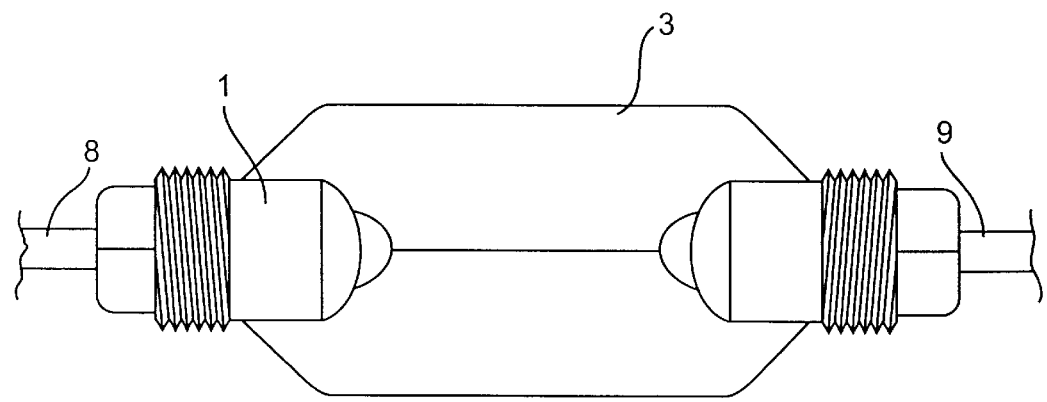
FIG. 5 is a side elevational view of the mixing valves shown in FIGS. 1–4.

As shown more clearly in FIGS. 1–3, a mixing valve 29 includes an inlet or fluid conduit 4 including a threaded portion 4' for connecting the mixing valve to a source of cold water (not shown). The valve 29 also includes a second fluid conduit 5 with a threaded end portion (5') for connection to a common outlet 60 (shown in FIG. 22). The fluid conduits 4 and 5 are defined by an outer wall 1. Third and fourth fluid conduits 6 and 7 are defined by an outer wall 2 and adapted to be connected to a source of hot water and the common outlet by means of threaded end portions 24 and 24'.

A pair of diaphragm valves 12 and 13 are disposed within chamber (12') and (13') which are defined by walls 44 and 44' and biased in a closed position (FIG. 1) by springs 14 and 15. The diaphragm valves 12 and 13 which are disposed within a housing 3 separate the first and second fluid conduits 4 and 5 and third and fourth conduits 6 and 7 respectively. The mixing valve 29 also includes a third fluid chamber 27 which is disposed between the chamber 12' and 13'. This third fluid chamber 27 includes an outlet or coupling 17 which is connected to a coupling 20 in the second fluid conduit 5, and pair of relatively small openings or passages 25 and 26 which connect the third chamber 27 with the first and second chambers 12' and 13'. An end cap 11 closes one end of the chamber 27 and holds a check valve 10 positioned within chamber 27 for opening and closing the passages 25 and 26. Each of the diaphragm valves also include a plurality of small openings 57 in the diaphragm in a conventional manner.

The chamber 12' also includes an outlet or coupling 16 for receiving a flexible tube 19a which is forced over the coupling 16 in a conventional manner. The coupling 16 allows hot water to flow out of the chamber 12' and through the flexible tube 19a, when it is desired to have a flow of undiluted hot water. When the hot water valve 41 (shown in FIG. 22) is opened, hot water flows through the flexible tubes 19a and 19b which is connected to the fourth fluid conduit 7 by the coupling 21. The tubes 19a and 19b are perfectly held together by an outer sleeve 9. The sleevepe 9 is positioned in a forward position of housing 3 by a As shown in FIG. 1, the mixing valve 29 of ABS or other suitable material is in a static condition because the two diaphragm valves 12 (for hot water) and 13 for cold are closed. The valves are closed because of the pressure through the fluid conduits 4 and 6 and the pressure of the springs 14 and 15 on the valves 12 and 13. This happens because of the small holes in the sides of the diaphragm valves 12 and 13. What happens is that the water passes through the small holes 57 and fills the chambers 12' and 13'. Then, when a foot valve 40 is opened, water from the cold and hot conduits 4 and 6 flow through the passages 25 and 26, common chamber 27, outlet or coupling 17 and through the flexible pipe or hose 18a through the foot valve 40 and back through the mixing valve 29 by means of the hose 18b and fluid conduit 5. This flow releases the pressure in the common chamber 27 and allows the diaphragms 12 and 13 to open. When the foot valve 40 is opened, the flow of hot and cold water is shown by the arrows in FIG. 2. As shown in FIG. 1, the hoses 18a and 18b are held together by an outer sleeve 8 and ring structure 22 which is positioned in one end 54 of housing 3. As shown therein, release of the pressure in the common chamber coupled with the pressure in fluid conduits 4 and 6 overcomes the pressure of springs 14 and 15 and opens valves 12 and 13 which allows a mixture of hot and cold water to flow to the common outlet.

FIG. 3 illustrates the mixing valve 29 during the flow of undiluted hot water to the common outlet. For example, when an individual wants a flow of undiluted hot water, they open a separate valve 41 (shown in FIG. 22) which is preferably mounted on a wall above the common outlet and at a height which is above the reach of small children. Water then flows out of the outlet or coupling 16 due to the water pressure in the separate chamber 13' through the flexible piping 19a, valve 41, back through the flexible piping 19b, coupling 21 and into the fluid conduit 7. Releasing the pressure in separate chamber 12' allows the diaphragm valve 12 to open so that undiluted hot water flows to the common outlet. As illustrated, the piping 19a and 19b are held together by an outer sleeve 9 and positioned at one end 55 of housing 3 by ring 23.

When the valve 41 is closed, i.e. released, the flow of water through the piping 19a and b stops which causes the pressure in chamber 12' to increase and to thereby close the valve 12 which stops the flow of hot water through the mixing valve.

Figure 6:
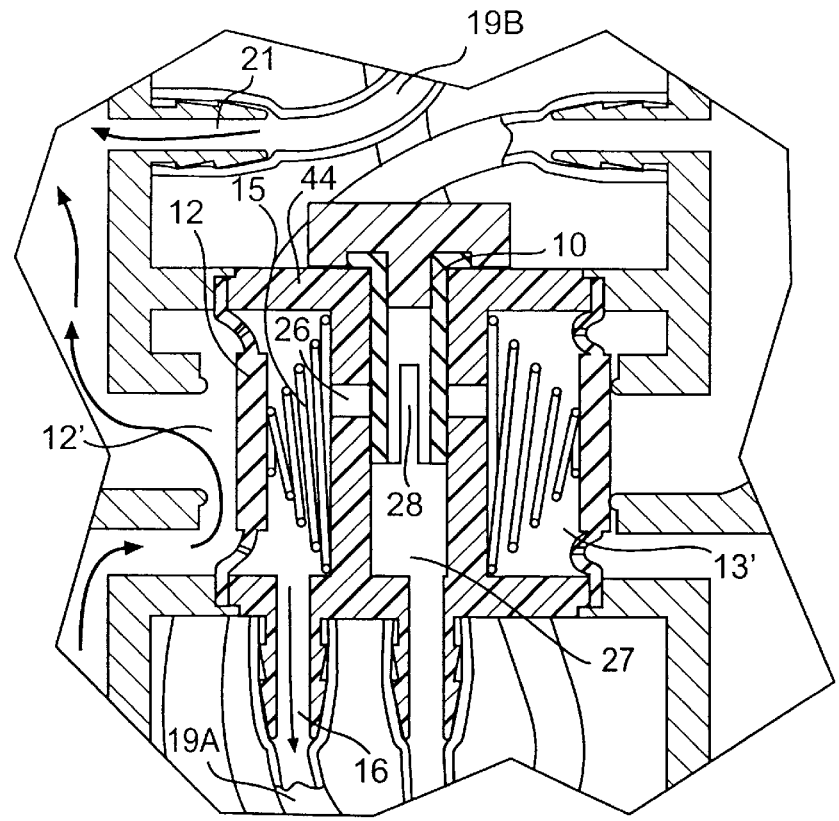
FIG. 6 is a cross sectional view of a portion of the mixing valve shown in FIGS. 1–5 which illustrates the position of a check valve and two diaphragm valves when there is a flow of undiluted hot water through the valve.

The flow of hot water through the mixing valve 29 is illustrate in FIG. 6 wherein the check valve 10 which includes a slot 28 is shown in a closed position since the foot valve 40 is in a closed position. In other words, the pressure is maintained in the common chamber 27 and also in the chamber 13'. As shown, hot water flows through chamber 12' when the diaphragm 12 is opened due to the release of the pressure in chamber 12'. The pressure is released when the valve 41 (FIG. 22) is opened which allows hot water to flow through the coupling 16 and hose 19a.

Figure 7:
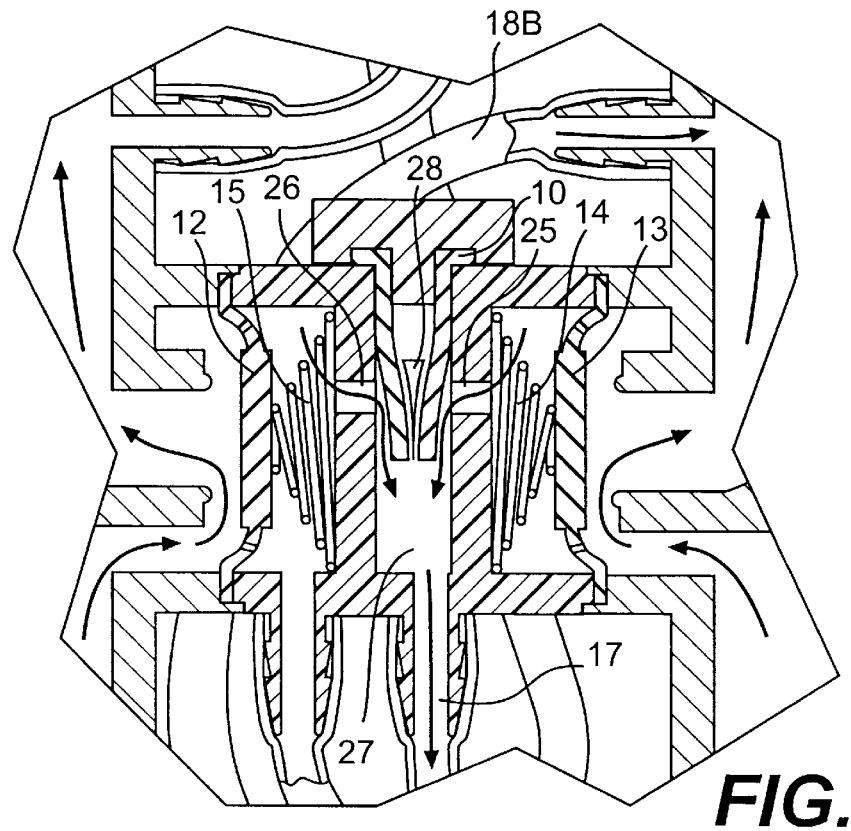
FIG. 7 is a cross sectional view of the portion of the valve shown in FIG. 6 but with the check valve and both of the diaphragm valves in an open position so that a mixture of hot and cold water is delivered to a common outlet.

However, when the foot valve 40 is opened, a mix of hot and cold water flows out of common chamber 27 and through the outlet or coupling 17 (See FIG. 7). Then when the pressure is released in the chamber 27, the check valve 10 opens which then allows the diaphragm valves 12 and 13 to open so that a mix of hot and cold water is delivered to the common outlet 60.

The foot operated on/off valve or foot valve 40 is illustrated in FIGS. 8, 9, 10, 16, 17 and 20. As illustrated therein, the foot valve 40 acts as a clamp to compress the flexible pipe or hose 18 in order to prevent the flow of water therethrough. The hose 18, shown at one end 53 of the valve 40 is preferably made of a silicon rubber or other durable material which will withstand repeated compression without cracking or breaking.

Figure 8:
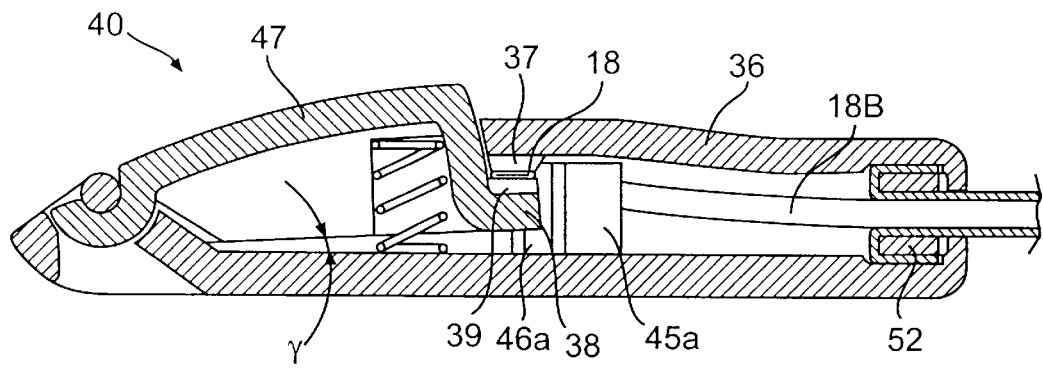
FIG. 8 is a cross sectional view of an actuating valve of the type incorporated in one embodiment of the invention and shown with the activating valve in a closed position.
Figure 22:
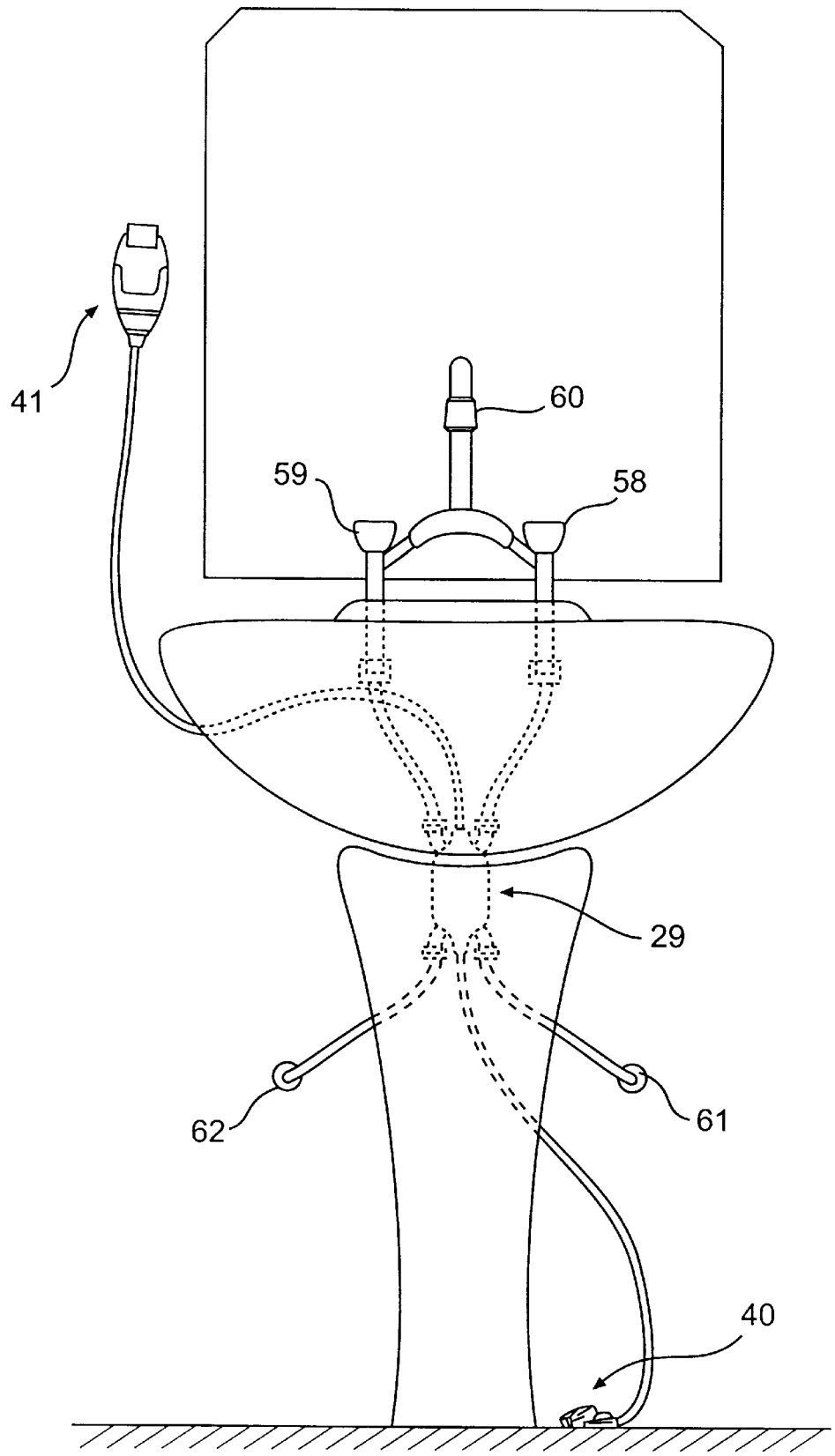

As shown in FIG. 8, the foot valve 40 is in a closed position with a pair of compression elements 37 and 39 actually engaging the flexible pipe or hose 18. The compression element 39 is mounted on a base portion 38 of a movable element 47. In a preferred embodiment of the invention the valve 40 includes a base member 56 which is preferably placed on the floor immediately adjacent to a wash basin 100 (FIG. 22). An essentially identical valve 41 for delivering undiluted hot water is typically wall mounted above the basin 100.

Figure 20:
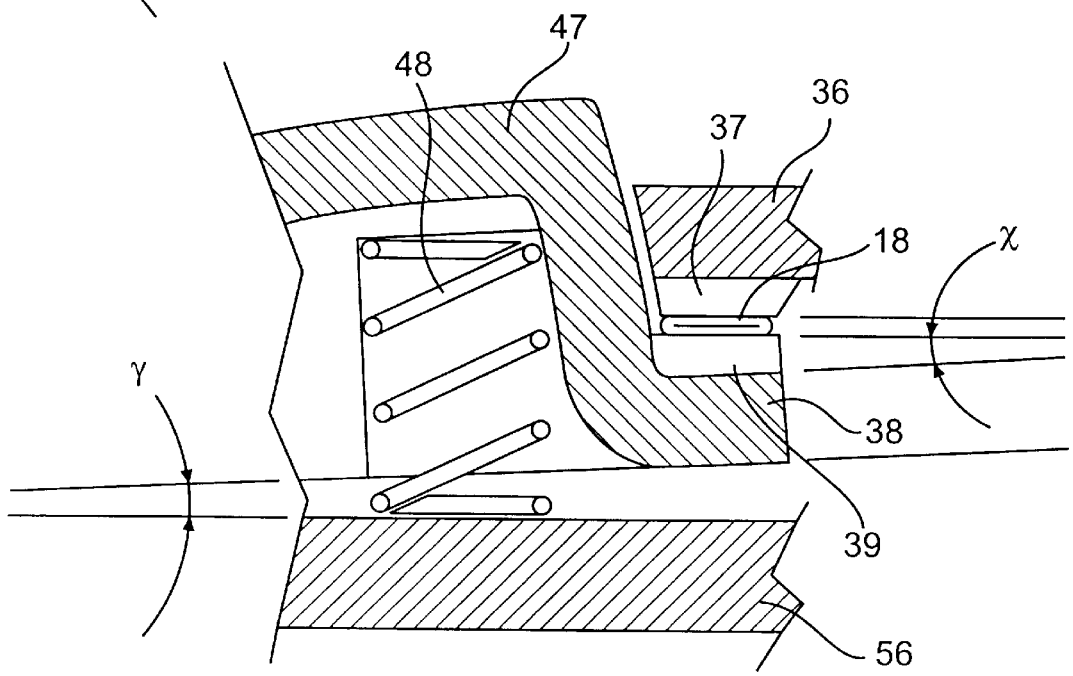
FIG. 20 .is an enlarged cross sectional view of a portion of the valve shown in FIG. 8 which more clearly shows the angles X and Y of a closing assembly when the valve is in a closed position.

The valve 40 also includes the movable element 47 and an upper fixed element 36 which forms the upper or outer portion of the valve 40. The movable element 47 is pivotally mounted to the base member 56 for a pivotal movement about pivot 50 with a forward portion 49 of the movable element 47 extending under and around the pivot 50, but behind a nose portion 51. A coil spring 48 is constructed and arranged to bias the movable element 47 into a closed position and maintain it in that position until compressed by a hand or foot. The valve 40 also includes a ring structure 52, at one end 53, about which an outer sleeve 8 is folded over thereon to maintain the flexible pipe or hose 18 within the valve. Outer positioning elements 46a and 46b and inner-positioning elements 45a and 45b are fixed to the base member for positioning the flexible pipe or hose 18 with a central portion thereof between the compression elements 37 and 39. An important aspect in the design of the foot valve is illustrated in FIG. 20 wherein the angle X and angle Y are equal. This is an important feature to assure that the hose 18 is fully compressed and that leakage does not occur.

Figure 12:
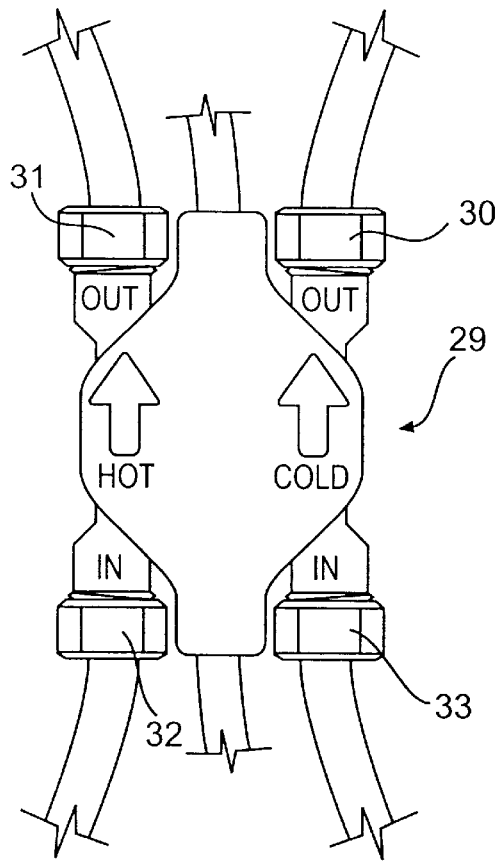
FIG. 12 is a top or plan view of the mixing valve shown in FIG. 11 but including piping to a water source (not shown) and a common outlet (not shown)
Figure 11:
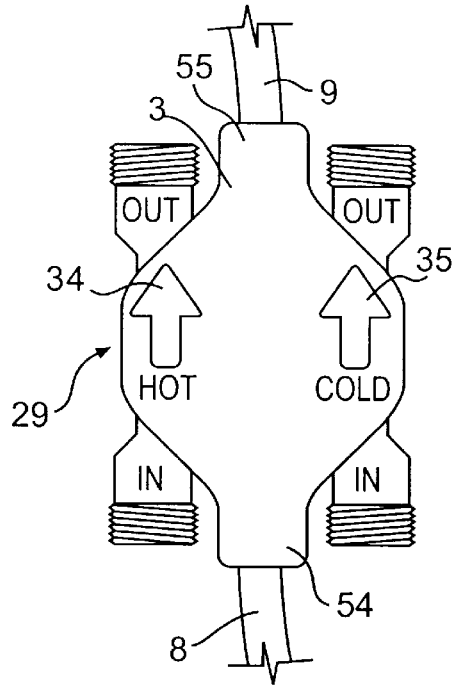
FIG. 11 is a top view of a mixing valve in accordance with the present invention.

FIGS. 11 and 12 show a top view of the mixing valve 29 with arrows 34 and 35 illustrating the flow of hot and cold water. In FIG. 11, the threaded end portions 4', 5', 24 and 24' are shown without collars. In FIG. 12, collars 30, 31, 32, and 33 are shown with appropriate hoses for directing water from the sources of hot and cold water to a common outlet.

Figure 13:
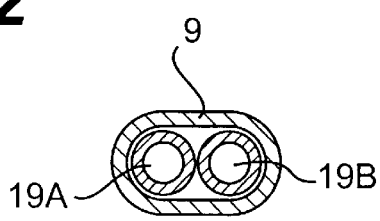
FIG. 13 is a sectional view taken along the line D—D in FIG. 2.
Figure 14:
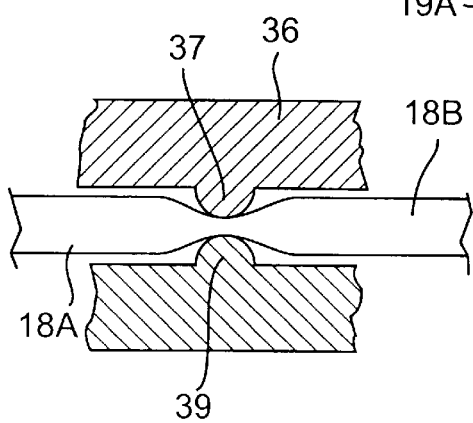
FIG. 14 is a cross sectional view taken along the line E—E in FIG. 16.

FIG. 13 is a cross sectional view along the lines D—D of FIG. 2 and illustrates the flexible tubes 19a and 19b which are encompassed by an outer sleeve 9. A cross section taken along the lines E—E is shown in FIG. 14 and illustrates a portion of a preferred embodiment of the foot valve 40. As illustrated, the compression elements 37 and 38 include rounded segments for compressing the hose 18a–18b and which are part of the upper element 36 and base portion 38.

Figure 15:
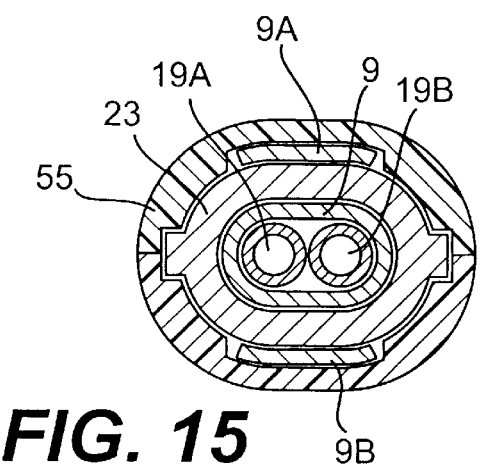
FIG. 15 is a cross sectional view taken along the line C—C in FIG. 2.
Figure 16:
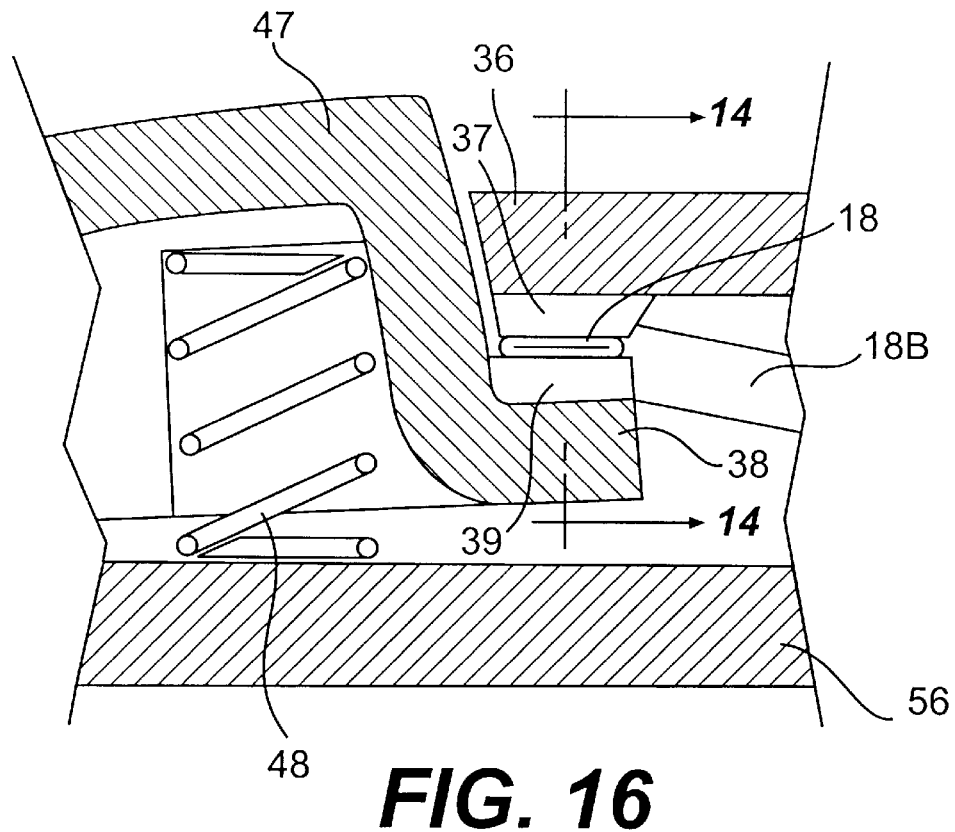
FIG. 16 is an enlarged cross sectional view of a portion of the valves shown in FIG. 8.
Figure 17:
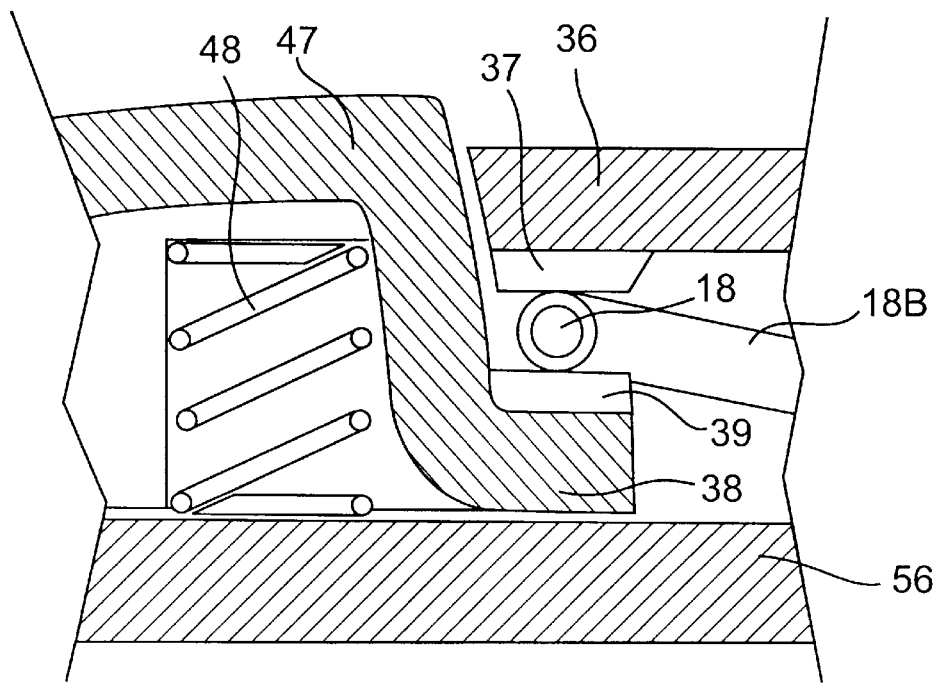
FIG. 17 is an enlarged cross sectional view of a portion of the valve shown in FIG. 9.

A cross sectional view taken along the lines C—C in FIG. 2 is shown in FIG. 15. As illustrated in FIG. 3a, the forward portion 55 of the housing 3 surrounds the parallel flexible tubes 19a and 19b which are held in place by the outer sleeve 9. This outer sleeve 9 is disposed within the ring 23 and folded over onto the ring 23 as indicated by 9A and 9B. In practice, this structure provides a tight or very snug fit which prevents the assembly shown in FIG. 13 from being pulled out of the housing 3.

Figure 9:
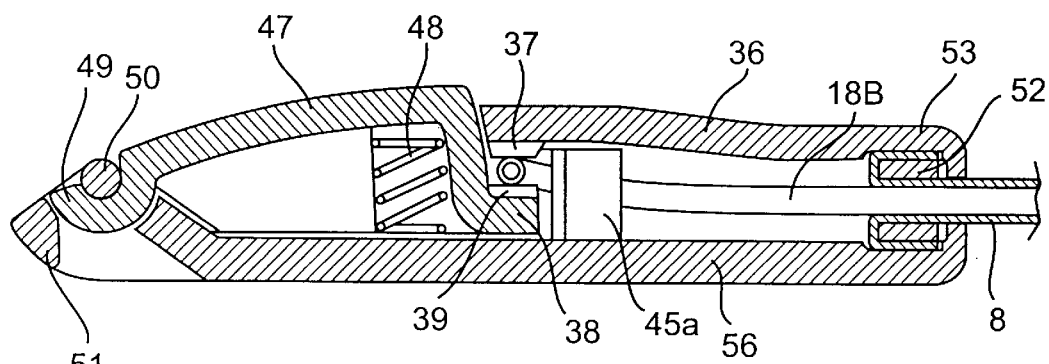
FIG. 9 is a cross sectional view of the valve shown in FIG. 8, but with the valve in an open position.
Figure 10:
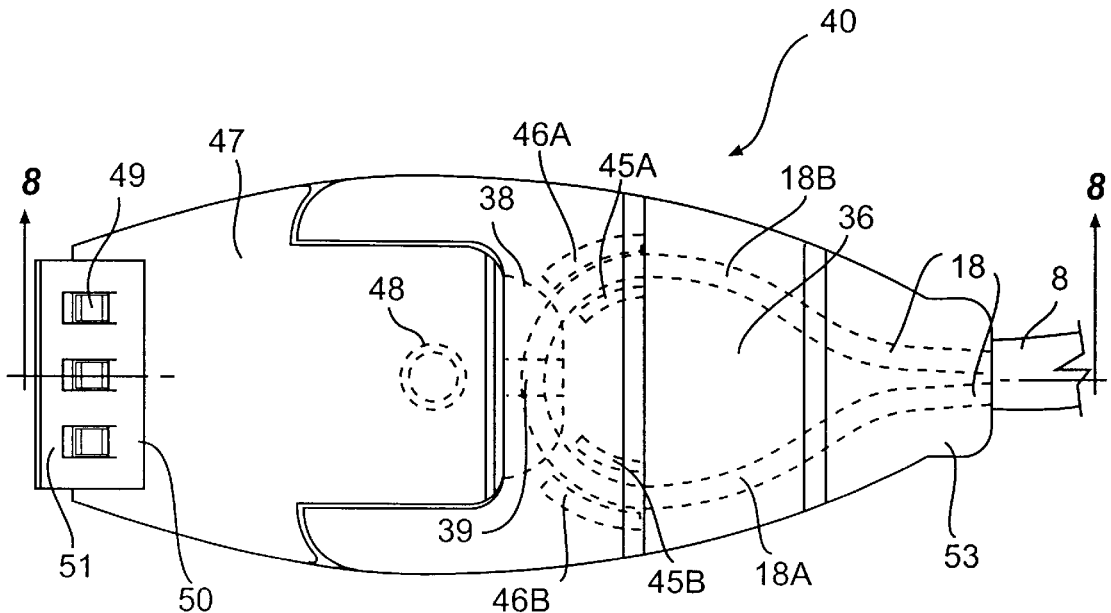
FIG. 10 is a top or plan view of the valve shown in FIGS. 8 and 9.
Figure 18:
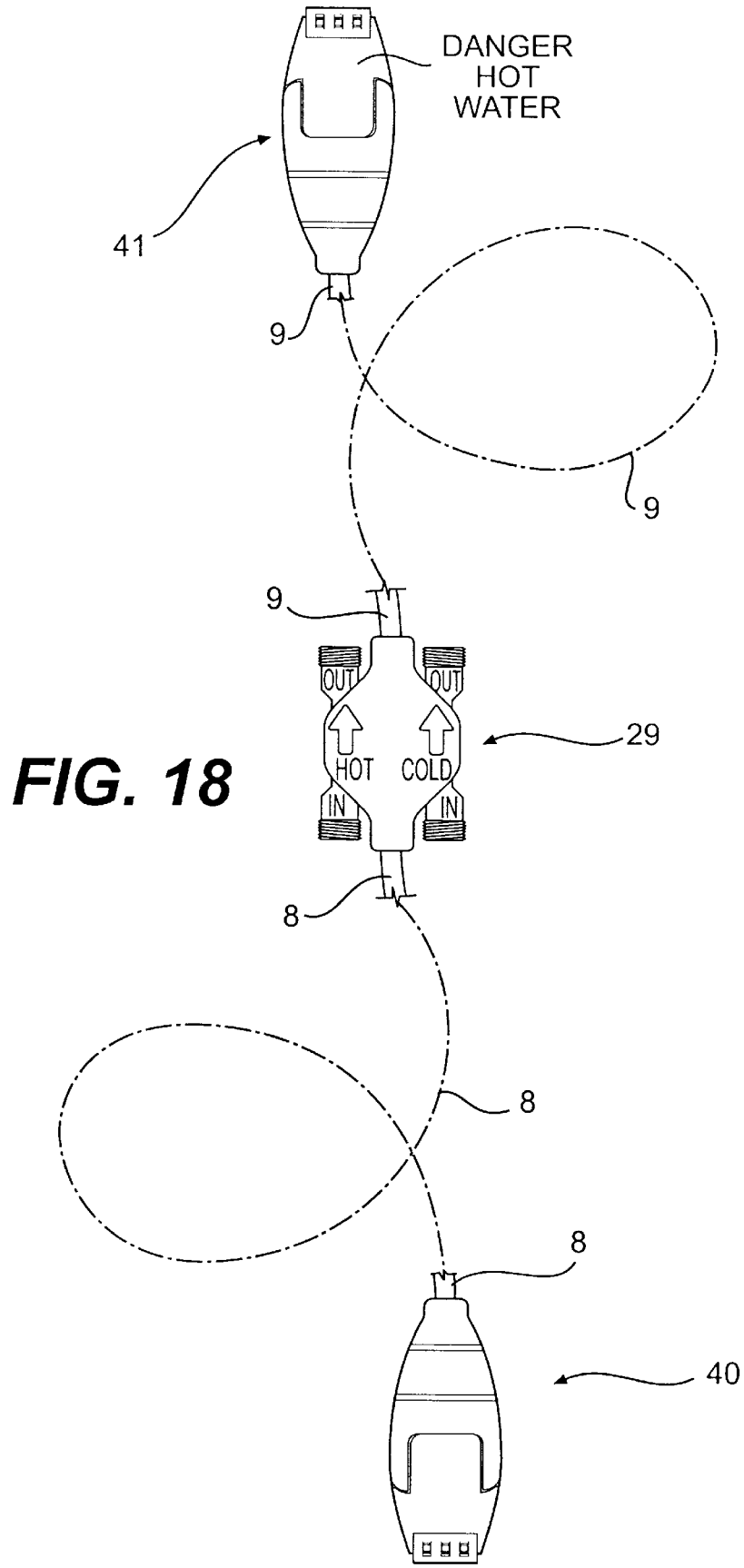
FIG. 18 is a schematic illustration of a mixing valve, foot operated valve and hot water valve in accordance with the present invention.
Figure 19:
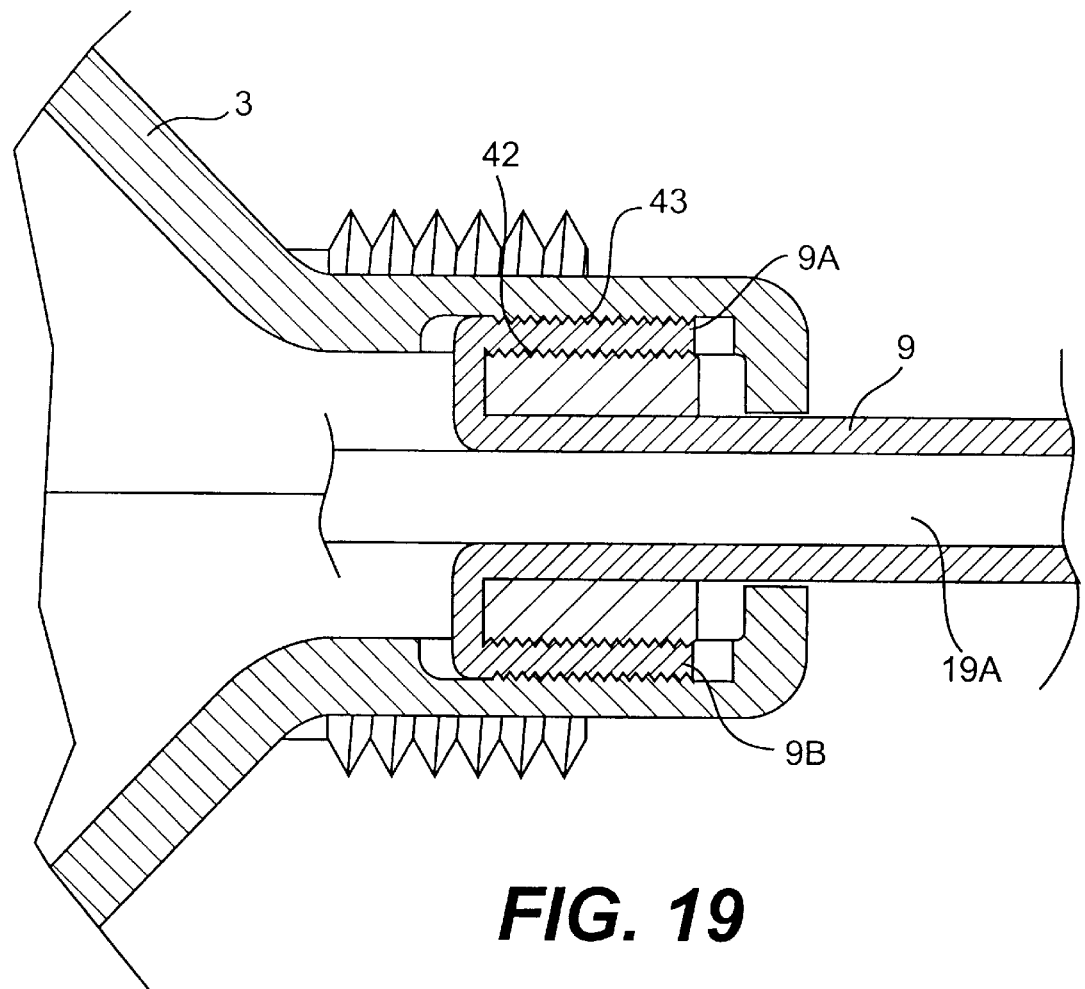
FIG. 19 is a cross sectional view of a first portion of a mixing valve in accordance with the present invention.

A schematic illustration shown in FIG. 18 illustrates the position of a foot valve 40, mixing valve 29 and hand-operated valve 41, as well as the outer sleeves 8 and 9 which are connected to the mixing valve 29 as well as the foot valve 40 and hand-operated valve 41 respectively. FIG. 9 illustrates a further detail when a position 43 of housing 3 and position 42 of ring 23 are grooved in order to maintain positions 9a and 9b of outer sleeve 9 securely within the housing 3.

Figure 21:
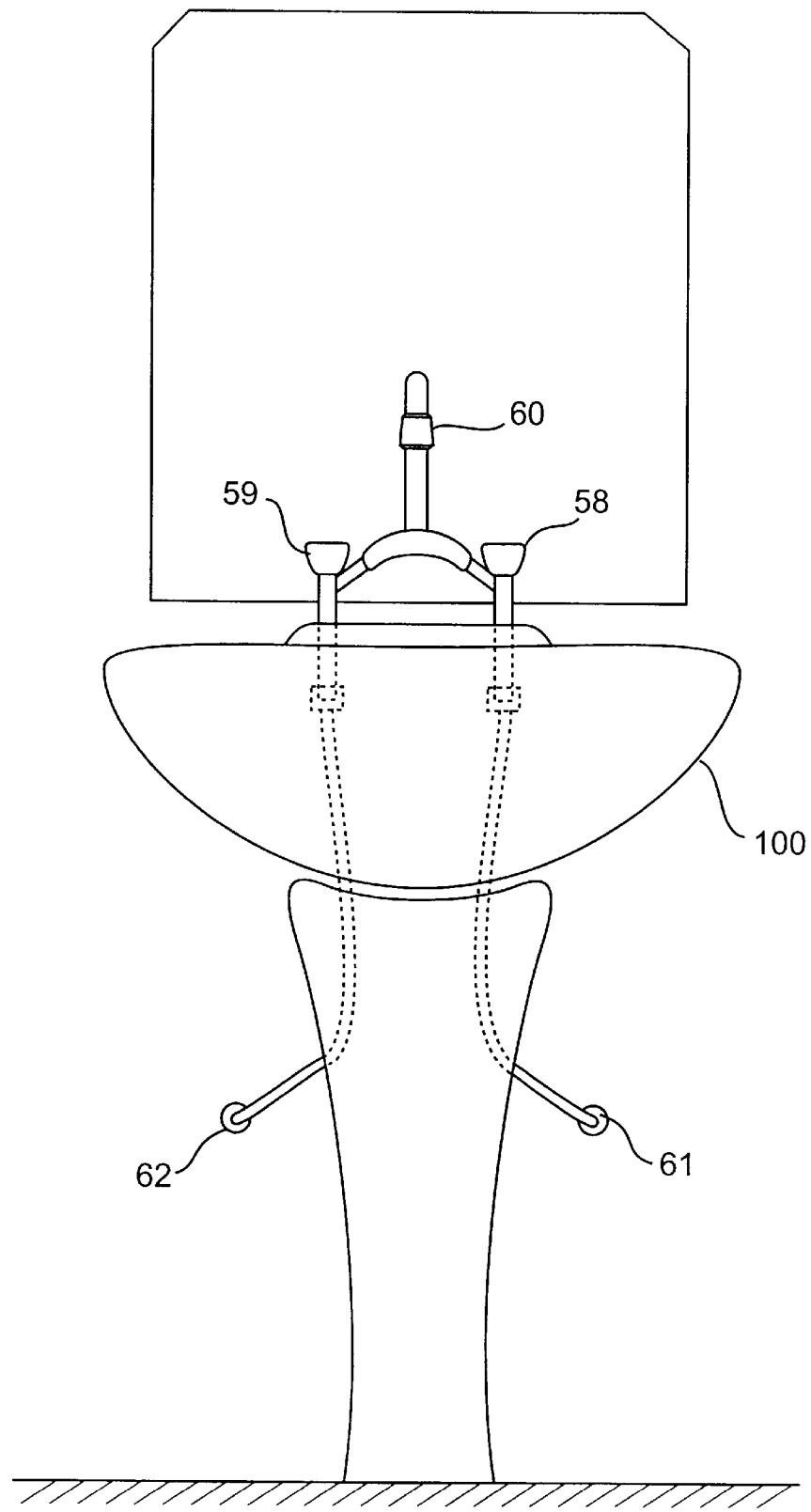
FIG. 21 is a schematic illustration of a prior art faucet assembly as used in a wash basin; and, FIG. 22 is a schematic illustration of a wash basin equipped with a flow control apparatus in accordance with the present invention.

A typical prior art faucet installation is shown in FIG. 21. That installation includes a wash basin 100 with a pair of conventional flow control valves or faucets 58 and 59 and common outlet 60. As shown, the pair of conventional flow control valves are connected to a source of hot and cold water 62 and 61.

For comparison, a typical installation of a flow control apparatus or system in accordance with the present invention is shown in FIG. 22. As shown therein, a wash basin 100 is equipped with a pair of conventional faucets or flow control valves 58 and 59 with a common outlet 60. A mixing valve 29 in accordance with the present invention is connected to each of the faucets 58 and 59 for providing a flow of hot and cold water from the sources 62 and 61 to the common outlet 60. A foot-operated valve 40 is used to provide a flow of mixed hot and cold water through the mixing valve to the common outlet 60. The mix can be varied by using the faucets 58 and 59. However, if the faucet 58 is turned off, the mixing valve will automatically stop the flow of hot water. However, with the faucet 58 turned on or off, use of the hand-operated valve 41 will cause a flow of undiluted hot water to the common outlet and into the wash basin 100.

While the invention has been described in connection with its preferred embodiments, it should be recognized that changes and modifications may be made therein without departing from the scope of the appended claims.

What is claimed is:

1. A flow control apparatus for regulating the flow of hot and cold water through a mixing valve and for preventing undiluted hot water from passing through the valve, said apparatus comprising a common outlet and a mixing valve connected to said common outlet for directing a flow of hot water and a flow of cold water to said common outlet, means for connecting said mixing valve to a source of hot water for delivering a flow of hot water to said mixing valve and through said mixing valve to said common outlet, means for connecting said mixing valve to a source of cold water for delivering a flow of cold water to said mixing valve and through said mixing valve to said common outlet, said mixing valve including prevention means for preventing the flow of hot water in the absence of a flow of cold water and separate means for bypassing said prevention means to provide a flow of undiluted hot water through said mixing valve and out of said common outlet.

2. A flow control apparatus according to claim 1 in which said mixing valve includes a common chamber and a pair of diaphragm valves on opposite sides of said chamber.

3. A flow control apparatus according to claim 2 which includes a check valve within said chamber for opening and closing said diaphragm valves.

4. A flow control apparatus according to claim 3 which includes first and second valves for regulating the flow of hot and cold water respectively to thereby adjust the temperature of the water delivered through said common outlet.

5. A flow control apparatus according to claim 3 which includes a remote activating valve for initiating and stopping the flow of hot and cold water to said mixing valve.

6. A flow control apparatus according to claim 5 in which said remote activating valve is a hands-free valve.

7. A flow control apparatus according to claim 6 in which aid flow control apparatus is disposed in a room with a floor, a plurality of walls and a wash basin and in which said remote activating valve is located on a floor of the room, and a second valve for providing for the flow of undiluted hot water is located on a wall of the room above the level of wash basin.

8. A flow control apparatus for regulating the flow of hot and cold water to a mixing valve and for preventing undiluted hot water from passing through the valve, said apparatus comprising a common outlet and a mixing valve connected to said common outlet for directing a flow of hot water and a flow of cold water to said common outlet, said mixing valve including a common chamber and a pair of diaphragm valves on opposite sides of said common chamber, a check valve disposed in said chamber for opening and closing said diaphragm valves, means for connecting said mixing valve to a source of hot water for delivering a flow of hot water to said mixing valve and through said mixing valve to said common outlet, means for connecting said mixing valve to a source of cold water for delivering a flow of cold water through said mixing valve to said common outlet, and means including said diaphragm valve for preventing the flow of hot water through said mixing valve in the absence of a flow of cold water.

9. A flow control apparatus according to claim 8 which includes separate means for overriding the means including said diaphragm valves for preventing the flow of hot water through said mixing valve in the absence of a flow of cold water to thereby provide a flow of undiluted hot water.

10. A flow control apparatus according to claim 9 which includes a remote activating valve for initiating and stopping the flow of hot and cold water to said mixing valve.

11. A flow control apparatus according to claim 10 in which said remote activating valve is a hands-free valve.

12. A mixing valve for regulating the flow of hot and cold water to a common outlet and for preventing the flow of hot water in the absence of a flow of cold water, said mixing valve comprising a housing and a first chamber within said housing, a common outlet and a first diaphragm valve including a valve seat and a diaphragm element disposed within said chamber, first and second fluid conduits connected to said first chamber and to one another through said first diaphragm valve, means for connecting said first conduit to a source of cold water, means for connecting said second conduit to said common outlet whereby cold water flows through said first and second conduits when said first diaphragm valve is in an open position, a second chamber within said housing and a second diaphragm valve including a valve seat and a diaphragm element disposed within said chamber, third and fourth fluid conduits connected to said second chamber and to one another through said second diaphragm valve, means for connecting said third conduit to a source of hot water and means for connecting said second conduit to a common outlet whereby hot water flows through said third and fourth conduits when said second diaphragm valve is in an open position, a common chamber disposed between said first and second chambers and a first fluid passageway connecting said common chamber and said first chamber, a second fluid passageway connecting said common chamber and said second chamber and a check valve disposed in said common chamber for allowing and preventing a flow of water through said first and second passageways and into said common chamber, a tubular element communicating with said common chamber for directing a flow of hot and cold water out of said common chamber when said check valve is in an open position and into one of said second and fourth conduits for delivery to said common outlet and means for closing said first and second diaphragm valves in the absence of fluid flow in said tubular element.

13. A mixing valve according to claim 12 in which the cross section of each of said passageways is relatively small with respect to the cross section of each of said diaphragm valves.

14. A mixing valve according to claim 13 which includes a second tubular element communicating with said second chamber for directing a flow of hot water out of said housing and connected to said fourth conduit so that a flow of hot water flows out of said second chamber to a remotely actuated valve and into said fourth conduit in order to supply undiluted hot water to the common outlet.

15. A flow control apparatus for regulating the flow of a first liquid with respect to the flow of a second fluid in a common distribution system, said apparatus comprising a mixing valve and a common outlet connected to said mixing valve, first regulating valve means for regulating the flow of a first fluid, second regulating valve means for regulating the flow of a second fluid, third valve means for regulating the flow of the first and second fluids to said common outlet, means for automatically preventing the flow of said first fluid when the flow of said second fluid is interrupted and separate valve means for overriding said means for automatically preventing the flow of said first fluid to thereby provide an undiluted flow of said first fluid to said common outlet.

16. A flow control apparatus according to claim 15 which includes a hands-free valve for initiating a mixed flow of the first and second fluids.

17. A flow control apparatus according to claim 16 wherein said hands-free valve is a floor mounted foot valve.

18. A flow control apparatus according to claim 16 which includes a wall mounted valve for providing an undiluted flow of said first fluid to said common outlet.

19. A flow control apparatus according to claim 16 wherein said foot valve includes a flexible tube for conveying a flow of mixed first and second fluid and means for fully compressing said flexible tube to prevent the loss of fluids.

20. A flow control apparatus according to claim 15 in which said third valve means for regulating the flow of the first and second fluids includes a pair of diaphragm valves and a check valve disposed between said diaphragm valve for initiating and stopping the flow of fluids.

* * * * *